Patented Dec. 8, 1931

1,835,441

UNITED STATES PATENT OFFICE

ROBERT SUCHY AND RUDOLF SCHULZE, OF BITTERFELD, GERMANY, ASSIGNORS TO I. G. FARBENINDUSTRIE AKTIENGESELLSCHAFT, OF FRANKFORT-ON-THE-MAIN, GERMANY

PROCESS FOR PRODUCING TRI-AMMONIUM PHOSPHATE

No Drawing. Application filed October 30, 1930, Serial No. 492,355, and in Germany November 2, 1929.

The present invention relates to a process of producing tri-ammonium phosphate from potassium phosphates.

According to a recent publication, it has been ascertained that the alkali and ammonium salts of polybasic acids show a diminished solubility in aqueous ammonia as compared with pure water, and that the strongest reduction of solubility occurs in connection with phosphoric acid salts. However, from this reference nothing may be inferred as to the relative solubility of the various alkali phosphates in ammoniacal solutions.

On the other hand, a general law has been established according to which ammonium salts show an increased solubility in ammoniacal solutions as compared with the corresponding potassium salts and it has been proposed to utilize this difference in solubility for the purpose of separating such salts by means of double decomposition.

We have now ascertained that the aforementioned law does not prevail without exception, and that from a solution containing primary, secondary, or tertiary potassium phosphate nearly the whole of the phosphoric acid is precipitated as tri-ammonium phosphate in the presence of ammonia, provided that carbonic acid, be it as carbonate of ammonia or in the form of free carbonic acid, is introduced into the solution in a quantity sufficient to combine with the potassium present as phosphate so as to form potassium carbonate.

In a strongly ammoniacal solution, the decomposition of, for example, di-potassium phosphate follows the equation $$K_2HPO_4 + CO_2 + 3NH_3 + H_2O = (NH_4)_3PO_4 + K_2CO_3.$$

With the object of producing tri-ammonium phosphate from potassium phosphates according to the present invention, we therefore proceed as follows:

An aqueous solution of potassium phosphate is saturate with ammonia while simultaneously supplying a quantity of carbonic acid sufficient to convert the liberated alkali into alkali carbonate, whereupon the precipitated tri-ammonium phosphate is separated from the resulting ammoniacal potassium carbonate solution. The tri-ammonium phosphate thus obtained is washed with concentrated water of ammonia. If desired it is then converted into mono- or di-ammonium phosphate by heating and thus splitting off ammonia, this step being known per se. The filtrate obtained from the tri-ammonium phosphate can be worked up into carbonate of potash by evaporation.

The double decomposition according to the equation cited above is preferably carried out with a solution in which the concentration of the phosphates is still insufficient to cause precipitation of the resulting alkali carbonate. The quantity of ammonia required for completely precipitating the phosphoric acid as tri-ammonium phosphate is the larger the smaller the phosphate concentration of the starting solution; but even with concentrated starting solutions at least about 20 percent by weight of ammonia are required.

Example

Into a solution containing 174 kgs. of $K_2HPO_4$ in 600 kgs. of water, 50 kgs. of $CO_2$ are introduced simultaneously with ammonia gas until the solution contains about 20 percent by weight of $NH_3$. After cooling, 200 kgs. of $(NH_4)_3PO_4.3H_2O$ are obtained from the ammoniacal potash lye, corresponding to 98 per cent of the phosphoric acid contained in the starting solution.

We claim:

1. A process which comprises introducing ammonia and carbonic acid into an aqueous solution of potassium phosphate and separating tri-ammonium phosphate from said solution.

2. A process which comprises introducing ammonia and carbonic acid into an aqueous solution of potassium phosphate, the carbonic acid being sufficient to combine with all the alkali liberated by the ammonia so as to form alkali carbonate, and separating tri-ammonium phosphate from said solution.

In testimony whereof, we affix our signatures.

ROBERT SUCHY.
RUDOLF SCHULZE.